(12) United States Patent
Carlini et al.

(10) Patent No.: US 7,229,358 B2
(45) Date of Patent: Jun. 12, 2007

(54) HIGH PERFORMANCE CONSTANT VELOCITY UNIVERSAL JOINT

(75) Inventors: Sean M. Carlini, Rockford, IL (US); John C. Frana, Loves Park, IL (US)

(73) Assignee: Rockford Acromatic Products Company, Loves Park, IL (US)

( * ) Notice: Subject to any disclaimer, the term of this patent is extended or adjusted under 35 U.S.C. 154(b) by 0 days.

(21) Appl. No.: 11/111,628

(22) Filed: Apr. 21, 2005

(65) Prior Publication Data
US 2006/0240897 A1    Oct. 26, 2006

(51) Int. Cl.
*F16D 3/06* (2006.01)

(52) U.S. Cl. ..................... 464/173; 464/906; 464/145

(58) Field of Classification Search .............. 464/173, 464/175, 171, 145, 906; 277/634–636
See application file for complete search history.

(56) References Cited

U.S. PATENT DOCUMENTS

| 923,443 | A | 6/1909 | Rhodes |
|---|---|---|---|
| 1,478,324 | A | 12/1923 | Dina |
| 1,615,317 | A | 1/1927 | Swenson |
| 1,685,509 | A | 9/1928 | Thiemer |
| 1,693,594 | A | 12/1928 | Cutting |
| 1,737,535 | A | 11/1929 | Funnell |
| 1,746,212 | A | 2/1930 | Beringer |
| 1,795,264 | A | 3/1931 | Peters |
| 1,845,794 | A | 2/1932 | Jeffrey |
| 1,899,840 | A | 2/1933 | Williams |
| 1,943,814 | A | 1/1934 | Cutting |
| 2,004,298 | A | 6/1935 | Shoemaker |
| 2,037,947 | A | 4/1936 | Swenson |
| 2,217,082 | A | 10/1940 | Swenson |
| 3,005,324 | A | 10/1961 | Zeller |
| 3,074,225 | A | 1/1963 | Reinecke |
| 3,087,314 | A | 4/1963 | Jarvis et al. |
| 3,241,336 | A | 3/1966 | Nemtsov |
| 3,260,071 | A * | 7/1966 | Westercamp ............. 464/171 |
| 3,423,958 | A | 1/1969 | Koelling |
| 3,572,446 | A | 3/1971 | Mazzarins |
| 3,574,277 | A | 4/1971 | Mayall |
| 3,585,816 | A | 6/1971 | Batt |

(Continued)

FOREIGN PATENT DOCUMENTS

DE            4205653 A1       8/1993

(Continued)

*Primary Examiner*—Aaron Dunwoody
(74) *Attorney, Agent, or Firm*—Leydig, Voit & Mayer, Ltd

(57) ABSTRACT

A high performance constant velocity universal joint is based on a body which encloses the constant velocity joint components and provides a smooth spherical outer surface. A one-piece semi-rigid plastic boot in the form of a truncated sphere has a smooth internal spherical surface sized to match the outer surface of the body. The plastic of the boot is sufficiently elastic to allow the boot to snap over the body, yet sufficiently resilient to snap the open end closed after the boot is snapped over the body to provide a substantial seal preventing entry of debris under the seal. A retaining ring is positioned on the boot near the truncated end to resist plastic creep which would result in enlarging the opening and allowing debris to enter the seal.

4 Claims, 3 Drawing Sheets

U.S. PATENT DOCUMENTS

| | | | |
|---|---|---|---|
| 3,645,115 | A | 2/1972 | Shotwell et al. |
| 3,733,668 | A | 5/1973 | Lange et al. |
| 3,764,647 | A | 10/1973 | McDow |
| 3,782,797 | A | 1/1974 | Lange et al. |
| 3,844,022 | A | 10/1974 | Kutash |
| 4,004,434 | A | 1/1977 | Raby |
| 4,067,626 | A | 1/1978 | McElwain |
| 4,138,863 | A | 2/1979 | Olson, Sr. |
| 4,144,724 | A | 3/1979 | Armasow et al. |
| 4,154,065 | A | 5/1979 | Diffenderfer |
| 4,317,340 | A | 3/1982 | Krude et al. |
| 4,324,114 | A | 4/1982 | Durham |
| 4,365,488 | A | 12/1982 | Mochida et al. |
| 4,366,996 | A | 1/1983 | Grandel |
| 4,371,357 | A | 2/1983 | Petrzelka et al. |
| 4,377,313 | A | 3/1983 | Olschewski et al. |
| 4,429,926 | A | 2/1984 | Olschewski et al. |
| 4,436,516 | A | 3/1984 | Olschewski et al. |
| 4,482,337 | A | 11/1984 | Petrzelka |
| 4,597,745 | A * | 7/1986 | Orian .......................... 464/173 |
| 4,627,826 | A * | 12/1986 | Juziuk et al. ................ 464/171 |
| 4,637,740 | A | 1/1987 | Olschewski et al. |
| 4,684,356 | A | 8/1987 | Kimata et al. |
| 4,705,490 | A | 11/1987 | Lindenthal |
| 4,713,040 | A | 12/1987 | Beigang et al. |
| 4,758,202 | A | 7/1988 | Maciag et al. |
| 4,768,995 | A | 9/1988 | Mangiavacchi |
| 4,834,691 | A | 5/1989 | Schultze et al. |
| 4,875,787 | A | 10/1989 | Bauer et al. |
| 4,886,479 | A | 12/1989 | Richtmeyer et al. |
| 4,943,262 | A | 7/1990 | Schultze |
| 4,946,422 | A | 8/1990 | Lindenthal et al. |
| 5,007,881 | A * | 4/1991 | Hazebrook ................... 464/171 |
| 5,035,051 | A | 7/1991 | Iijima |
| 5,094,651 | A | 3/1992 | Cornay |
| 5,277,659 | A | 1/1994 | Cornay |
| 5,417,613 | A | 5/1995 | Aiken |
| 5,593,351 | A | 1/1997 | Culp |
| 5,626,519 | A | 5/1997 | Joyner |
| 5,697,849 | A | 12/1997 | Culp |
| 6,042,271 | A | 3/2000 | Harris et al. |
| 6,350,201 | B1 | 2/2002 | Sedlmeier et al. |
| 6,361,444 | B1 * | 3/2002 | Cheney et al. ............... 464/175 |
| 6,520,859 | B2 | 2/2003 | Beitzel et al. |
| 6,716,105 | B2 | 4/2004 | Lindenthal et al. |
| 7,004,842 | B2 * | 2/2006 | Fairchild et al. ............ 464/140 |
| 2003/0134682 | A1 | 7/2003 | Matthews |
| 2003/0211894 | A1 | 11/2003 | Rivin |
| 2004/0209694 | A1 | 10/2004 | Maciag |

FOREIGN PATENT DOCUMENTS

| | | |
|---|---|---|
| GB | 2218754 A * | 11/1989 |
| JP | 10331862 A | 12/1998 |

* cited by examiner

HIGH PERFORMANCE CONSTANT VELOCITY UNIVERSAL JOINT

FIELD OF THE INVENTION

This invention relates to constant velocity joints, and more particularly to those capable of being used in adverse environmental conditions.

BACKGROUND OF THE INVENTION

Constant velocity joints are used in numerous vehicular applications where the rotational velocity oscillation of a conventional cardan joint is unacceptable. For example, in the front suspension of a front wheel drive automobile, there will be two constant velocity joints per axle. They are also used in off-road heavy-duty equipment, in trucks, and in high performance recreation vehicles.

When the application is not overly environmentally adverse, constant velocity joints are excellent. However, in environmentally unfriendly applications they are less desirable because of the problems of keeping dirt and debris out of the joint. A better understanding of that will be appreciated upon review of FIG. 1 which shows a conventional prior art constant velocity joint.

FIG. 1 is, as will be apparent to those skilled in the art, a diagram of a constant velocity joint. An input shaft 21 is attached to a housing 22 which is formed to have a plurality of ball races 23. An inner race member 25 also includes a plurality of ball races, and a plurality of balls 26 connect the two members 25, 22 by means of the balls 26 riding in pairs of the associated races. A cage 28 encircles the balls 26 and keeps them in a constant velocity plane as the joint flexes. Typically the inner race 25 is splined at 30 and receives a shaft 32 splined at 31. By its very nature, the end 40 of the constant velocity joint through which all of the components are assembled is open. A primary seal is provided by boot 35. It is usually a fairly large and flexible member to accommodate the movement of the joint. Thus it is usually made of relatively flexible rubber and is fixed by a ring 36 to the outside of the housing and by another ring 37 to the outside of the shaft 32. A bellows area 38 allows for flexing of the boot 35 as the angle of the output shaft 32 changes with respect to the input shaft 21.

In the normal automotive environment a boot of this type can protect the joint for many thousands of miles of operation. However, as has become apparent to some motorists, once the boot tears, debris and moisture can enter the joint because the boot itself is the primary seal. It is not, like in conventional cardan joints, a simple secondary dust shield, but is the primary seal for keeping foreign material out of the workings of the joint mechanism. Thus, when the boot tears, it is not long thereafter, without attention, that the joint will fail.

Although it is desirable to use constant velocity joints in more environmentally demanding applications, the inability of the seal to withstand tough environmental conditions is a strong negative factor. In off the road applications, for example, rocks and debris thrown up by the tires, or over which the vehicle can skid is readily available to tear the relatively soft rubber boot. In off the road heavy machinery applications, not only is there a substantial danger of tearing the boot during a relatively short period of operation, but almost a guarantee of enough debris to cause the joint to fail shortly after it has torn.

For other recreational applications, such as four wheel drive vehicles, all-terrain vehicles, rock climbers, and the like where the universal joints are flexed to their limits because of the uneven nature of the terrain, the constant velocity joints will also be a benefit. But again, there is also the possibility of likelihood of tearing the rubber boot with almost certain failure of the joint to follow, particularly when running through sand, water, and the like.

There are also suggestions in the art to use closer fitting, less flexible covers over constant velocity joints. However, these are typically characterized as complex, often formed of multiple parts, requiring springs or the like to keep them in operation, and having relatively limited flexing capability, well short of the 40 degree flexing capability demanded in some off road applications.

BRIEF SUMMARY OF THE INVENTION

In view of the foregoing, it is a general object of the present invention to adapt the constant velocity joint to a more hostile environment by providing a more reliable primary seal than has heretofore been provided.

It is a further object to make the seal relatively inexpensive, simple to install, and easy to maintain and having a significant flexing capability, on the order of 40 degrees.

According to the invention there is provided a high performance constant velocity universal joint which is based on a body which encloses a conventional set of constant velocity components. The body has a smooth spherical outer surface. A one-piece semi-rigid plastic boot is provided in the form a truncated cylinder. The boot has a smooth internal spherical surface sized to match the spherical outer surface of the body. The boot is truncated such that it is larger than a half sphere, and has an opening at the truncated end which is smaller than the inner diameter of the sphere. The plastic of the boot is sufficiently elastic to allow the boot to snap over the body to a conforming position to provide a close sliding fit thereover. The plastic body is sufficiently resilient to snap the open end closed after the boot is snapped over the body to provide a substantial seal preventing entry of debris under the seal formed by the boot. A retaining ring is positioned on the boot near the truncated end to resist plastic creep from enlarging the opening and allowing debris to enter the seal.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
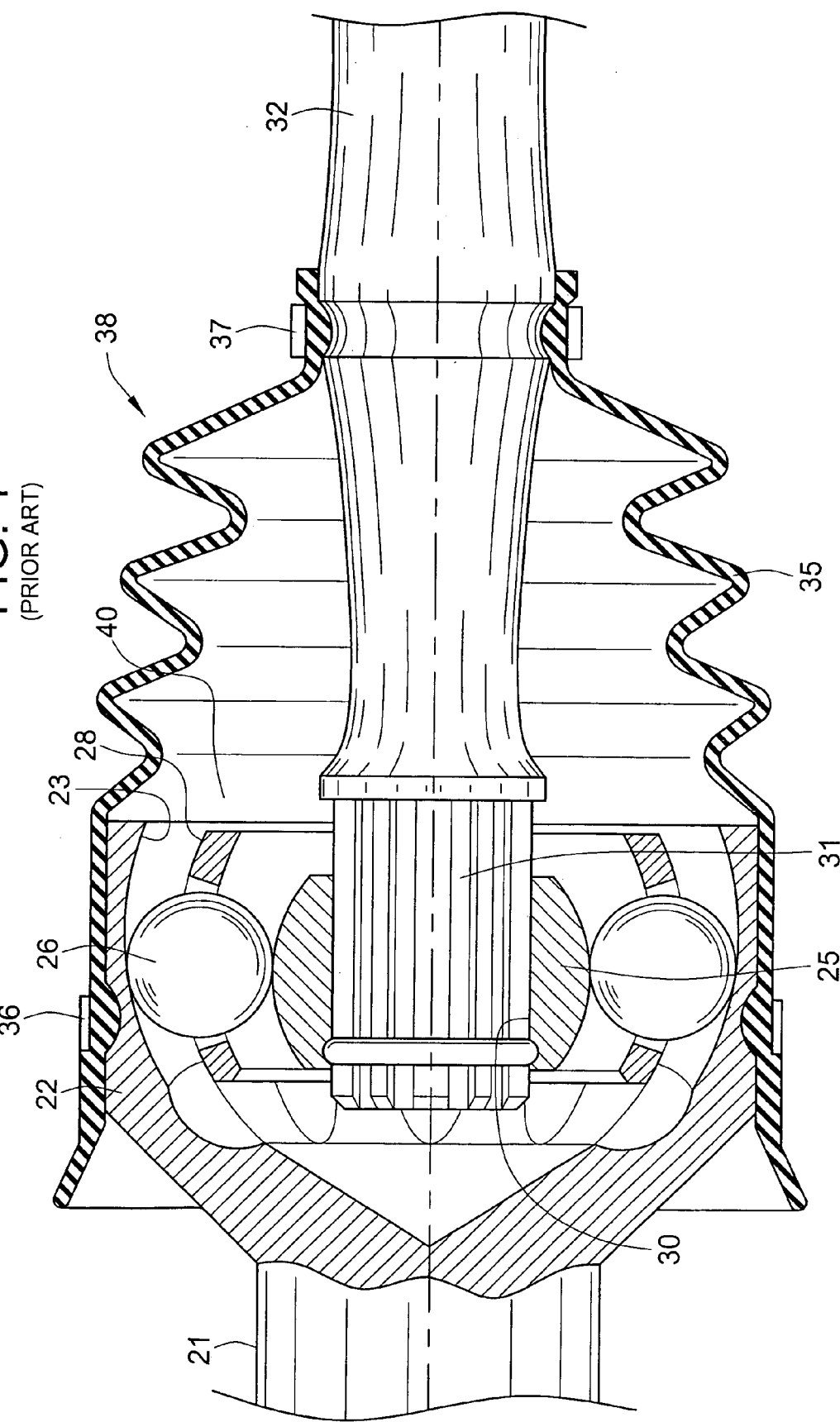
FIG. 1 is a partial sectional diagram showing a conventional constant velocity joint with conventional rubber boot.
Figure 2:
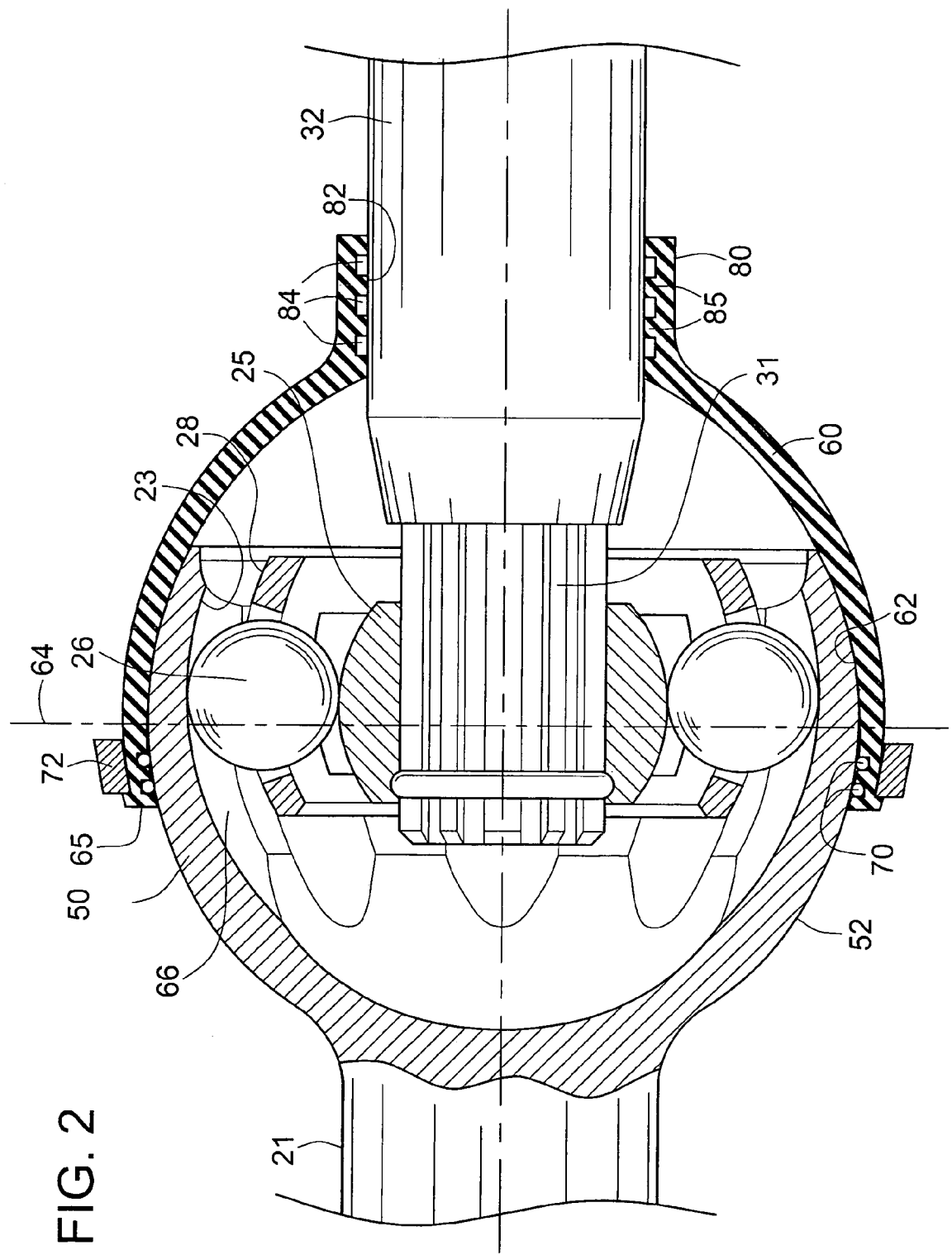
FIG. 2 is a diagram similar to FIG. 1 but illustrating a constant velocity joint constructed in accordance with the present invention.

Turning now to the drawings, and particularly to FIG. 2, there is shown the components of a constant velocity joint used in practicing the present invention. Like FIG. 1, an input shaft 21 is coupled to an output shaft 32 by means of the constant velocity joint.

In the FIG. 2 embodiment an outer housing or body 50 of particular configuration encloses the remaining conventional elements of the constant velocity joint. The body has races 23, and the joint also includes an inner race 25, also having races, drive balls 26 and a cage 28. The inner race 25 has a splined opening to receive the splined end 31 of the output shaft 32. Thus, the shaft 32 can flex at any angle with respect to the input shaft 21. The maximum angle which can be accommodated without interference is on the order of 40 degrees.

The outer surface 52 of the body 50 is formed as a smooth spherical surface for purposes now to be described. In practicing the invention a semi-rigid plastic boot 60 is provided. The boot has a smooth internal spherical surface 62 which is sized to match the spherical outer surface of the body. By matching the outer surface is meant that when the boot 60 is snapped into place over the body 50, a sliding fit is provided between the mating spherical surfaces so that one shaft can move angularly with respect to the other while the boot simply slides over the spherical surface of the body to maintain a seal.

It can be appreciated from FIG. 2 that the boot 60 is larger than a half sphere. If the boot 60 were simply a half sphere, it would be truncated at about the phantom line 64 shown dashed in FIG. 2. However, it extends beyond that such that where truncated at 65, the inner diameter of the opening 66 is smaller than the inner diameter of the boot 60. As a result, the boot 60 itself will simply not fit onto the outside of the spherical body 50 without being forced thereon. Thus, after the joint is assembled, the boot 60 is forced downwardly over the spherical housing 50 which causes the opening 66 to expand sufficiently to fit over the outer diameter of the spherical housing 50. The boot 60 is sufficiently elastic that the opening 66 momentarily expands to allow the boot 60 to actually pop or snap into place and to assume a rest position in which the surfaces 52, 62 of the two spheres 50, 60 match as shown in FIG. 2. It is locked fairly firmly in this position by the resilience of the plastic material which creates a force which tends to close the opening 66 and thus to maintain the locked and conformed condition between the two elements 50, 60. This sliding fit which is thus provided between the two spherical surfaces 52, 62 is adequate to keep the internal workings of the joint clean. To enhance the sealing effect, wiper grooves 70 are provided near the open end 66 which tend to wipe debris off exposed portions of the body 50 as the boot 60 moves over those portions during angular movement of the two shafts 21, 32.

We have found that over time plastic creep of the material of the boot tends to relax the gripping action at the opening 66. To counteract the plastic creep from opening a gap between the end 65 of the boot and the spherical surface 52 of the housing, we position a retaining ring 72 over the plastic boot, near the truncated end. The retaining ring can be, for example, a simple steel ring which is heat treated, then split, then put into the position shown in FIG. 2. The original diameter of the ring 72 before heat treatment is smaller than the diameter shown in ring 72, such that when it is split and forced into place a gap is provided between the ends of the steel ring which causes a continued compressive force around the end of the plastic boot, tending to continually resist the effects of plastic creep. Other forms of mechanical retainer can also be used, but we currently prefer the snap ring because of its simplicity and rugged reliability.

The shaft end of the boot is provided with a sliding fit over the outside of shaft 32. The end portion of the shaft 32 which mates with the boot is a relatively smooth shaft section, and the boot has a cylindrical flange 80 having an inner surface 82 which closely fits over the shaft 32. A series of grooves 84 are formed on the inside of the cylindrical surface to provide a series of wipers 85 which tend to scrape collected debris from the shaft, upon relative movement, thereby to prevent the introduction of contaminants into the housing via the shaft.

Figure 3:
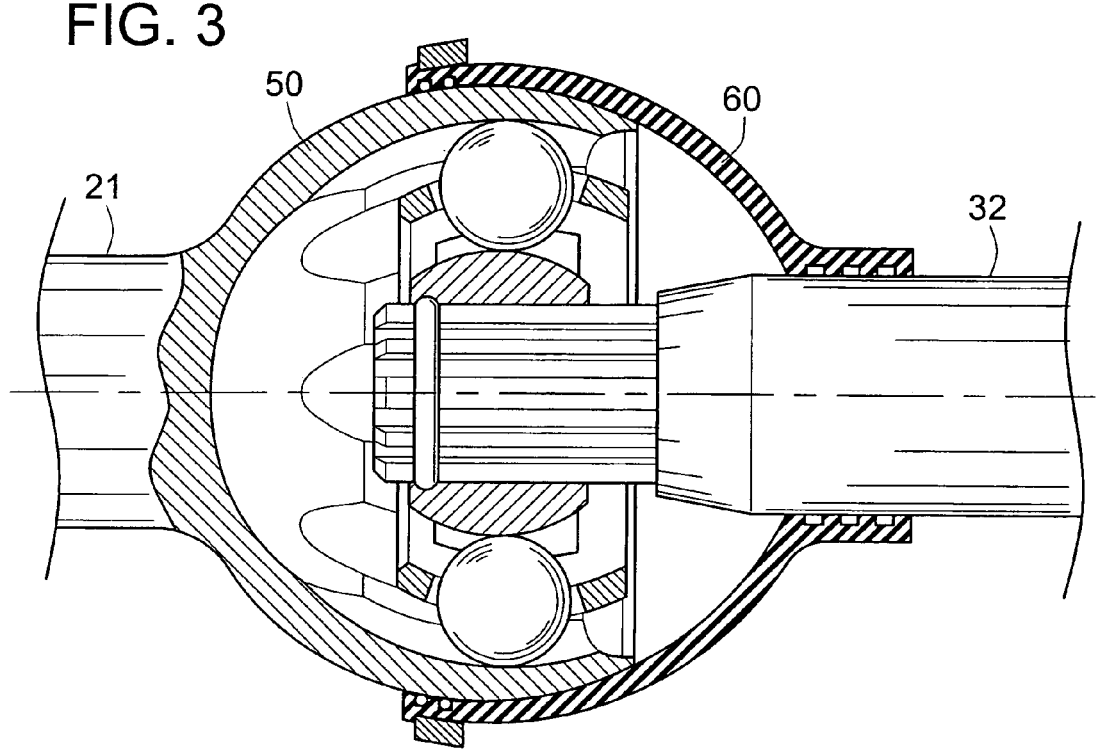
FIGS. 3 and 4 are diagrams similar to FIG. 2 but showing the joint in straight and flexed configuration.
Figure 4:
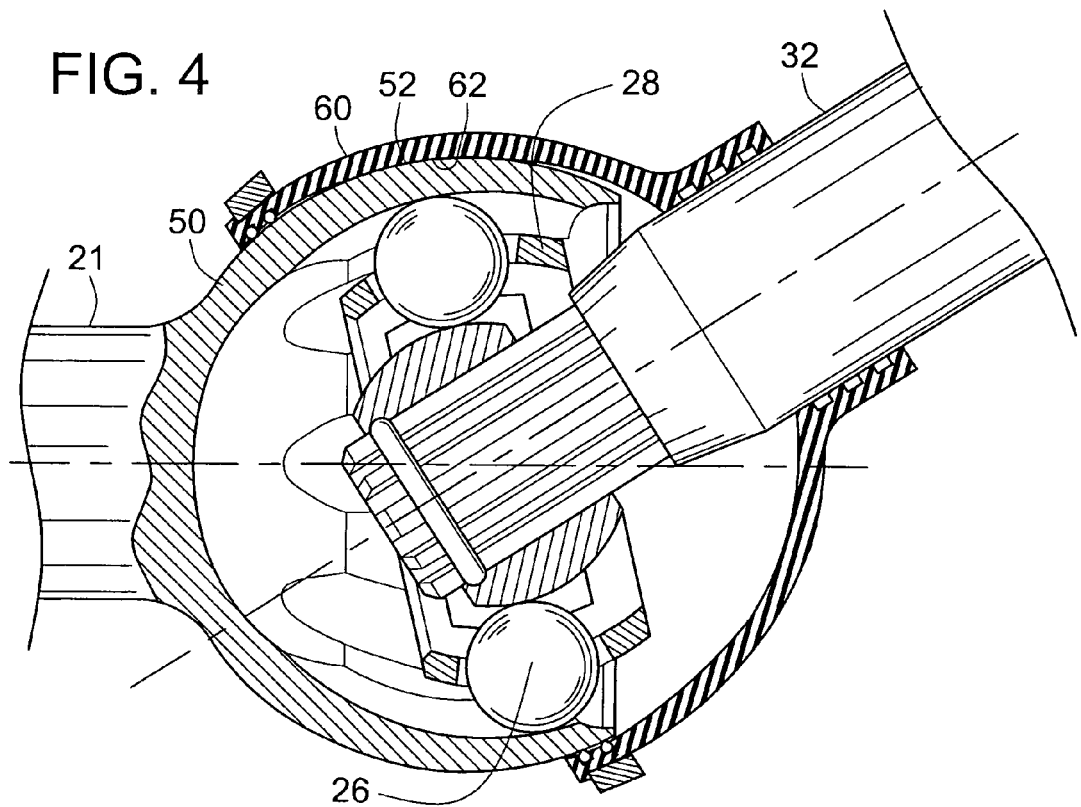

Referring briefly to FIGS. 3 and 4, FIG. 3 is similar to FIG. 2 and is provided for reference. FIG. 4 shows the condition when the output shaft 32 is flexed by about 40 degrees with respect to the input shaft 21. It will be seen that the inside spherical surface 62 of the boot 60 continues to conform to the outer spherical surface 52 of the housing 50 during the entire angular movement of one shaft 32 with respect to the other 21. The upper portion of the boot 60 covers a greater and greater section of the upper spherical portion 50, whereas the lower section of the boot 60 slides to very near the tip. It is also noted that the angle of the internal cage 28 has flexed to accommodate the angular motion of the shafts 21, 32 and to keep the balls 26 in the constant velocity plane. However, the important thing to note with respect to the present invention is the continued ability of the arrangement to prevent debris from entering. The close fitting nature of the boot 60, the fact that it is of much harder and less flexible material than flexible boots of the past, and its close fitting nature all contribute to the extreme reliability of the arrangement, even in environmentally adverse conditions.

While a variety of materials can be used for molding the plastic boot 60, at this point we continue to prefer oil-filled nylon. Oil-filled nylon resists moisture absorption, which is a significant characteristic for some applications. Nylon of thicknesses approximately those illustrated in the drawings, on the order of 0.125 inches, can be formed with sufficient elasticity and flexibility to allow the boot 60 to pop over the spherical surface 52 of the housing 50. The nylon also retains its shape and thus has sufficient resilience to close the gap and closely fit about the spherical surface 52. The material is subject to plastic creep over time, and this is resisted by the snap ring 72 or other external mechanical restraint. Other forms of plastic, known to those skilled in the art, will also be found suitable for providing these characteristics.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A high performance constant velocity universal joint comprising in combination:
    a body enclosing a set of constant velocity components including a cage and drive balls forming the universal joint, the body having a smooth spherical outer surface;
    an input shaft;
    an output shaft;
    a one-piece semi-rigid plastic boot in the form of a truncated sphere, the one-piece boot comprising a truncated end and a shaft end, the shaft end opposite the truncated end, the boot having a smooth internal spherical surface sized to slidingly engage with the spherical outer surface of the body;
    the one-piece boot being truncated at the truncated end such that it is larger than a half-sphere with an opening at the truncated end which is smaller than the inner diameter of the sphere;
    the plastic of the boot being sufficiently elastic to allow the boot to snap over the body to a conforming position providing a close sliding fit thereover, the plastic being sufficiently resilient to snap the truncated end closed after the boot is snapped over the body to provide a substantial seal preventing entry of debris under the seal formed by the boot;
    the shaft end of the one-piece boot slidingly engaging the input shaft or the output shaft of the universal joint; and
    a retaining ring positioned on the boot near the truncated end to resist plastic creep from enlarging the opening and allowing debris to enter the seal.

2. The combination of claim 1 wherein the constant velocity joint is configured for maximum angular displacements up to about 40 degrees, and the boot is configured to maintain the seal over the maximum angular displacement.

3. The combination of claim 1 further comprising:
    wiper grooves formed on an inside of the boot near the truncated end for resisting entry of debris into a sealed area of the constant velocity joint.

4. The combination of claim 1 in which the shaft end of the one-piece boot comprises a cylindrical flange encircling the shaft and having a plurality of wiper grooves therein for preventing debris on the shaft from entering the boot.

* * * * *

UNITED STATES PATENT AND TRADEMARK OFFICE
CERTIFICATE OF CORRECTION

| | |
|---|---|
| PATENT NO. | : 7,229,358 B2 |
| APPLICATION NO. | : 11/111628 |
| DATED | : June 12, 2007 |
| INVENTOR(S) | : Carlini et al. |

Page 1 of 1

It is certified that error appears in the above-identified patent and that said Letters Patent is hereby corrected as shown below:

On the title page (56):
The listing of References Cited should include the following U.S. patent document:

4,419,086     12/1983     Condon

Signed and Sealed this

Fourteenth Day of August, 2007

JON W. DUDAS
*Director of the United States Patent and Trademark Office*